United States Patent
Livingston et al.

(10) Patent No.: US 8,388,813 B1
(45) Date of Patent: Mar. 5, 2013

(54) HIGH ENERGY EFFICIENCY BIOMASS CONVERSION PROCESS

(75) Inventors: Andrew D. Livingston, Independence, KS (US); Bijoy J. Thomas, Independence, KS (US)

(73) Assignee: Earth Care Products, Inc., Independence, KS (US)

( * ) Notice: Subject to any disclaimer, the term of this patent is extended or adjusted under 35 U.S.C. 154(b) by 0 days.

(21) Appl. No.: 13/347,822

(22) Filed: Jan. 11, 2012

(51) Int. Cl.
*C10B 7/10* (2006.01)

(52) U.S. Cl. ........ 202/118; 202/117; 202/131; 202/133; 202/136; 202/247; 202/259; 422/200; 422/209; 422/229

(58) Field of Classification Search ............ 585/240, 585/242; 44/589, 590; 422/200, 209, 229; 202/100, 105, 117, 118, 128, 131, 133, 136, 202/247, 259
See application file for complete search history.

(56) References Cited

U.S. PATENT DOCUMENTS

| | | | |
|---|---|---|---|
| 4,553,978 A * | 11/1985 | Yvan | 44/280 |
| 4,686,008 A * | 8/1987 | Gibson | 202/118 |
| 4,787,917 A * | 11/1988 | Leclerc de Bussy | 44/606 |
| 5,017,269 A * | 5/1991 | Loomans et al. | 201/25 |
| 6,270,630 B1 * | 8/2001 | Xing | 202/84 |
| 7,155,841 B2 * | 1/2007 | Livingston | 34/136 |
| 7,893,307 B2 * | 2/2011 | Smith | 585/241 |
| 2006/0280669 A1 * | 12/2006 | Jones | 423/445 R |
| 2011/0214343 A1 * | 9/2011 | Wechsler et al. | 44/605 |

* cited by examiner

*Primary Examiner* — Nina Bhat
(74) *Attorney, Agent, or Firm* — Hovey Williams LLP

(57) ABSTRACT

Improved, fuel-efficient systems are provided for the processing of biomass, such as wood or crop residues, food waste or animal waste in order to selectively obtain torrefied and/or carbonized final products. In general, the processes involve thermally drying incoming biomass using a dryer employing the hot gas output of a fuel-operated burner. Next, the dried product is torrefied in an indirect torrefaction reactor so as to evolve light volatile organic compounds which are used as a gaseous fuel source for the burner. The torrefied product can be recovered, or some or all of the torrefied product may be directed to a carbonization reactor coupled with a reactor burner. Carbonization serves to remove most of the remaining VOCs which are used as a gaseous fuel input to the dryer. In certain instances, portions of the dried biomass are directed to the burners, as an additional source of fuel.

6 Claims, 8 Drawing Sheets

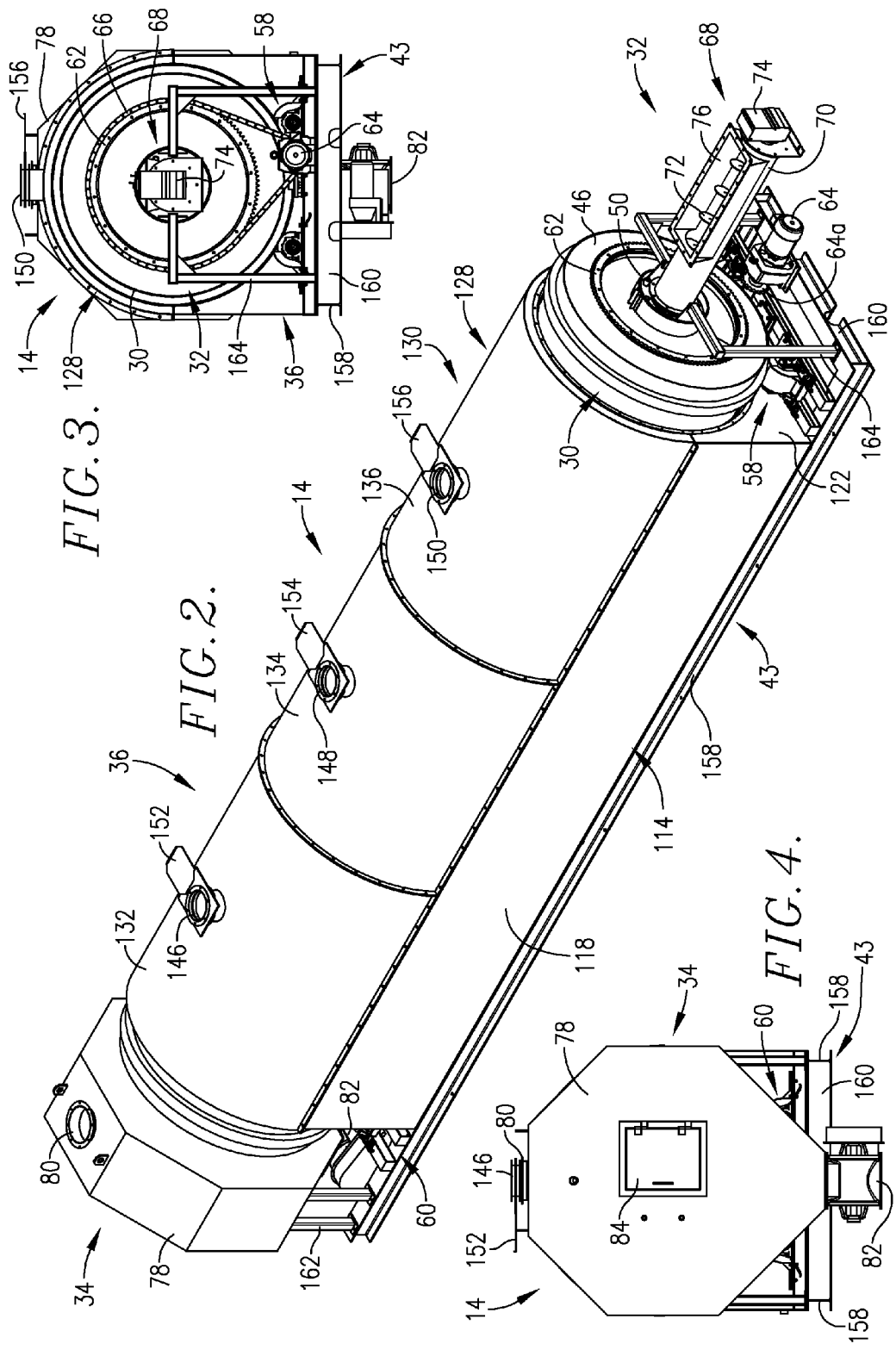

HIGH ENERGY EFFICIENCY BIOMASS CONVERSION PROCESS

BACKGROUND OF THE INVENTION

1. Field of the Invention

The present invention is broadly concerned with methods and apparatus used in the processing of biomass to yield torrefied and/or carbonized (i.e., charcoal) biomass. More particularly, the invention is concerned with such methods and apparatus whereby starting biomass is initially dried and then torrefied in a specialized torrefaction reactor, with the combustible gases evolved from the biomass during torrefaction being used as a source of fuel for the initial biomass drying step. In other forms of the invention, at least a portion of the torrefied product may be carbonized in a separate carbonization reactor, with the combustible gases evolved from carbonization also being used as a source of fuel. The processes of the invention are characterized by high energy efficiency, and in some forms the entire thermal energy required for steady-state processing is derived from the evolved combustible gases.

2. Description of the Prior Art

Biomass as understood in the art and as used herein refers to a biological material derived from living, or recently living organisms. In the context of biomass for energy, this is often used to mean plant-based materials, but biomass can equally apply to both animal and vegetable-derived materials. Biomass is carbon-based and is composed of a mixture of organic molecules containing hydrogen, usually including atoms of oxygen, and often with other atoms, including alkali, alkaline earth, and heavy metals. Plant-based biomass is normally lignocellulo sic in nature and can be derived from a variety of sources: wood, such as forest waste, arboricultural activities, and wood processing; agricultural residues, such as corn stover and rice straw; grasses, such as switchgrass and miscanthus. Other biomass sources include food waste from food and drink manufacture, preparation, and processing, or industrial waste, municipal solid waste, and animal waste. Biomass as-received generally has a moisture content of 5-80% by weight.

Techniques have been developed in the past for processing biomass to obtain useful fuels. Generally, the native biomass is preliminarily pre-sized, dried and sized, and is thereafter thermally treated to obtain various end products, including torrefied biomass and carbonized (charcoal) biomass. Torrefaction involves thermal processing to evolve combustible organic gases, particularly volatile organic compounds (VOCs). However, the torrefied product still contains heavy VOCs and, if used as a fuel, will have a tendency to "smoke." Carbonization removes most of the remaining VOCs in the torrefied biomass, leaving a residue which is essentially free of smoke-producing compounds and is composed essentially of fixed carbon.

Generally, attempts have been made to carry out many or all stages of the biomass processing in a direct-fired single reactor. This has proved to be problematical because of low production rates and the fact that a single reactor cannot provide the optimum conditions for drying, torrefaction, and carbonization. Moreover, the throughput of single-reactor systems is relatively low, given that most single carbonization systems are batch systems.

SUMMARY OF THE INVENTION

The present invention overcomes the problems outlined above and provides improved processes and equipment for the torrefaction and/or carbonization of a starting biomass. In general, the processes of the invention comprise first thermally drying the untreated, pre-sized biomass to a reduced moisture content in a dryer using the hot gas output of a fuel-operated burner assembly. Normally, the untreated biomass is reduced to a relatively uniform size (e.g., a maximum cross-sectional dimension of from about 0.125-0.75 in.) using a hammermill or other size-reduction equipment, prior to drying. Advantageously, the drying step is carried out in a rotary dryer using an incoming hot drying gas at a temperature of from about 400-1000° F., more preferably from about 600-800° F. Where the preferred dryer is employed, the drying drum would be rotated at a speed of from about 5-10 rpm. The residence time in the dryer can range from 5 seconds to 8 minutes, depending upon the particle size of the incoming biomass. In the drying step, the moisture content is reduced to a level of from about 2-15% by weight, and more preferably from about 2-4% by weight.

In the next step, at least a portion of the dried biomass is thermally torrefied in an indirect torrefaction reactor different than the dryer using the hot gas output of the fuel-operated burner assembly to generate: (1) a first solid product output stream comprising torrefied biomass; (2) a first burnable gaseous output stream comprising burnable organic constituents evolved from the torrefaction of the biomass; and (3) a first residual gas stream from the torrefaction reactor comprising the gas used to indirectly torrefy the dried biomass. Importantly, at least a portion of the first burnable gaseous output stream is used as at least a part of the fuel to operate the burner assembly. Preferably, the first residual gas stream is also used as a source of heat for the biomass dryer.

In the torrefaction process, the temperature within the reactor should be from about 350-650° F., and more preferably from about 400-600° F. The indirect heating gases to the reactor preferably have a temperature of from about 400-800° F., more preferably from about 500-750° F. The residence time within the torrefaction reactor generally ranges from about 5-25 minutes, and more preferably from about 8-20 minutes. The oxygen content with the torrefaction reactor should be less than about 8% by weight, and more preferably less than about 6% by weight. Where the preferred torrefaction reactor is employed, the shell thereof should be rotated at a rate of from about 0.5-5 rpm, more preferably from about 1-3 rpm. As used herein, "torrefied biomass" refers to a treated biomass product having moisture content of up to about 4% by weight, a reduced volatiles content of from about 10-30% of the volatiles content of the dried, pre-torrefied feedstock, and a fixed carbon content of up to about 35% by weight.

The first solid product output stream from the torrefaction reactor may be wholly recovered as a torrefied product. More commonly, however, at least a portion of this solid product output stream is directed to an indirectly heated carbonizing reactor different than the torrefaction reactor, in order to carbonize the torrefied biomass with the hot gas output of the burner assembly to generate: (1) a second solid product output stream comprising carbonized biomass; (2) a second burnable gaseous output stream comprising burnable organic constituents evolved from the carbonization of the torrefied biomass; and (3) a second residual gas stream from the carbonization reactor comprising the gas used to indirectly carbonize the torrefied biomass. As in the case of the torrefaction reactor, at least a portion of the second burnable gaseous output stream is used to operate the burner assembly. Similarly, it is preferred to use the second residual gas stream as a source of heat for the dryer.

During carbonization, the temperature within the reactor will range from about 600-1100° F., more preferably from about 700-800° F. The gases used to indirectly heat the carbonization reactor will be at a temperature of from about 700-1200° F., and more preferably from about 800-1000° F. The VOC-laden output gases from the carbonization reactor recycled to the reactor burner as fuel should have a temperature of from about 600-1000° F., more preferably from about 700-900° F. The residence time of the material within the carbonization reactor will range from about 5-30 minutes, more preferably from about 8-20 minutes. The oxygen content within the carbonization reactor should be less than about 8% by weight, more preferably less than about 4% by weight. Where the preferred carbonization reactor is employed, the shell thereof should be rotated at a rate of from about 0.5-5 rpm, more preferably from about 1-3 rpm. As used herein, "carbonized biomass" or "charcoal" refers to a treated biomass product having moisture content of up to about 4% by weight, a VOC content of up to about 35% by weight and fixed carbon content of up to about 60% by weight.

Preferably, the burner assembly comprises separate dryer and reactor burners respectively operably coupled with the biomass dryer and the torrefaction reactor; and where a carbonization reactor is employed, the reactor burner is also coupled with this reactor. Also, when it is desired to produce only a torrefied biomass or both torrefied and carbonized biomass, a portion of the dried, pre-torrefied solid product output stream from the dryer is directed to the burner assembly as a part of the fuel for the operation thereof.

The preferred torrefaction and carbonization reactors of the invention are substantially identical, save for the materials used in the construction thereof. Thus, these reactors comprise an elongated, axially rotatable shell having a biomass input adjacent one end thereof and a treated biomass output adjacent the other end thereof, with a housing in surrounding relationship to the shell and defining with the shell an indirect heating zone, and including a hot gas inlet operable to receive hot gas for indirectly thermally treating biomass within the shell, and a gas outlet. The outlet includes a frustoconical wall with internal spiral fighting along the length thereof, with the wall secured to the shell and rotatable therewith. The spiral flighting is preferably in the form of a number of individual spiral walls circumferentially spaced from one another around the frustoconical wall. Further, it is preferred to employ a series of internal flights along the length of the shell and each including a first segment secured to the internal surface of the shell, and a second segment oriented at an angle relative to the first segment.

BRIEF DESCRIPTION OF THE DRAWINGS

FIG. 2 is a front perspective view of the rotary torrefaction reactor forming a part of the systems of FIGS. 1A-1C;

FIG. 3 is a front elevation of the reactor illustrated in FIG. 2, with parts broken away to reveal the construction thereof;

FIG. 4 is a rear elevational view of the reactor of FIG. 2;

DETAILED DESCRIPTION OF THE PREFERRED EMBODIMENT

Figure 1A:
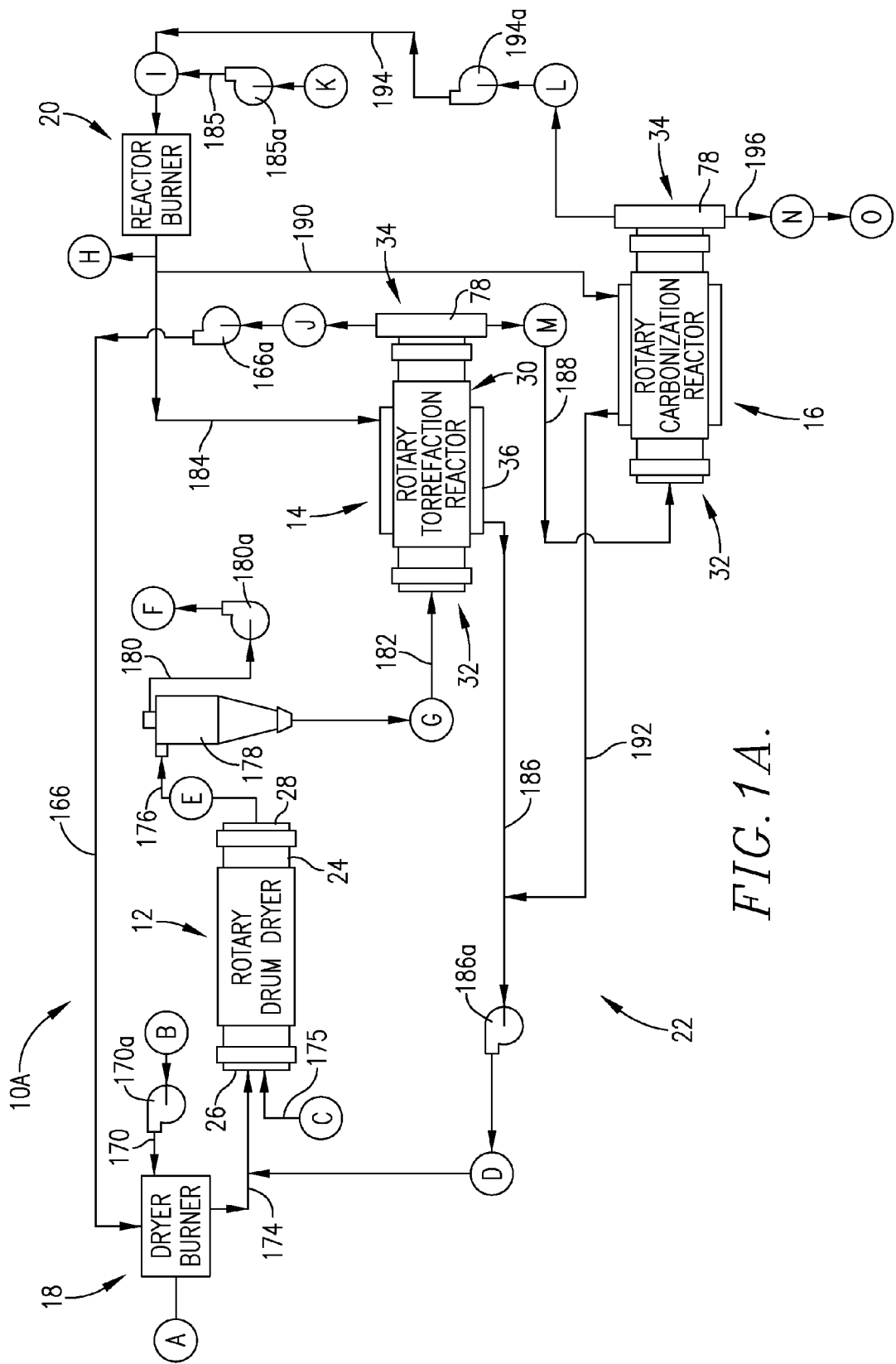
FIG. 1A is a schematic flow diagram illustrating the important components and operation of the preferred biomass conversion system of the invention, for the production of a charcoal end product.
Figure 1B:
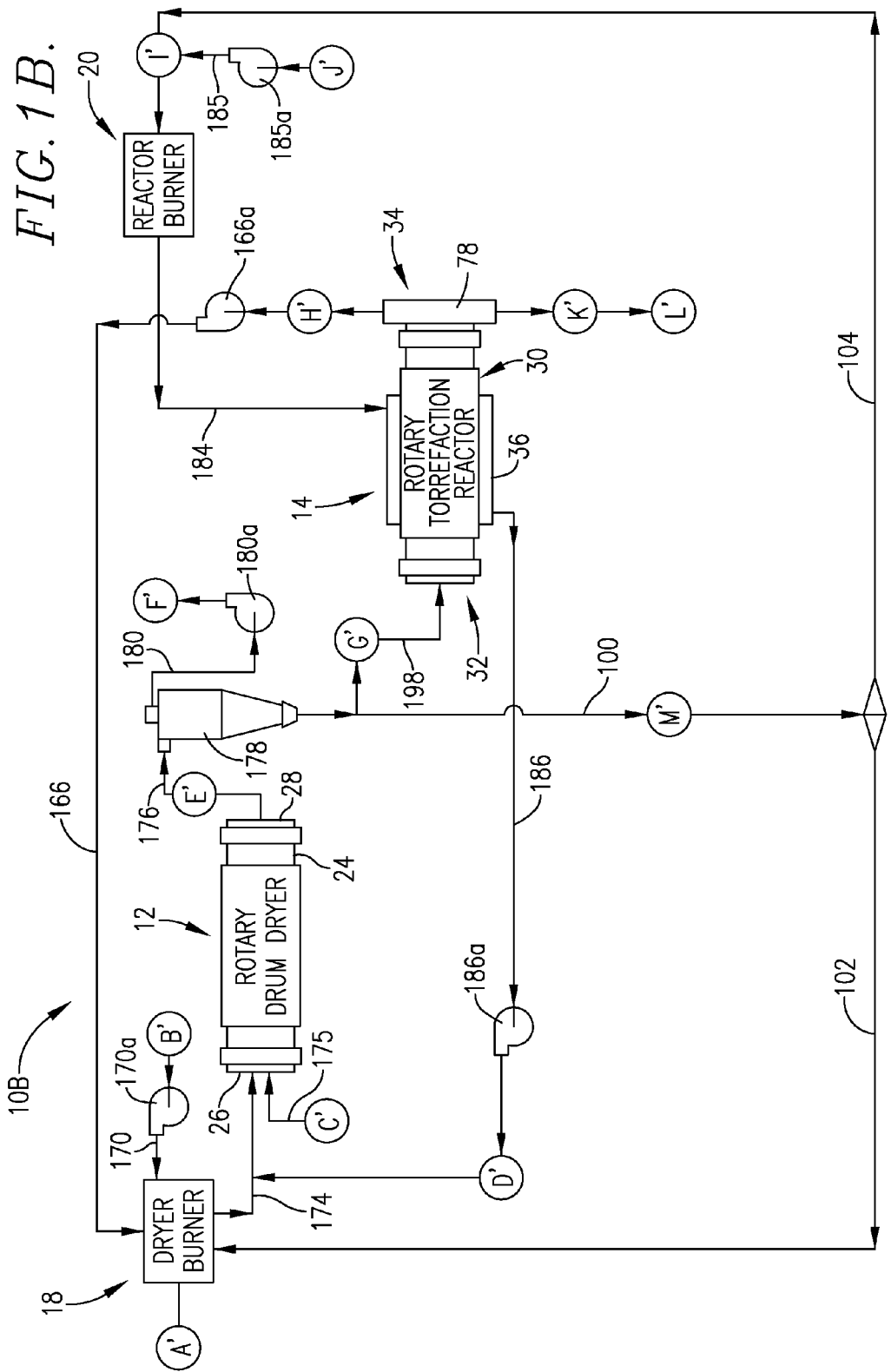
FIG. 1B is a schematic flow diagram illustrating the important components and operation of the preferred biomass conversion system of the invention, for the production of torrefied end product.
Figure 1C:
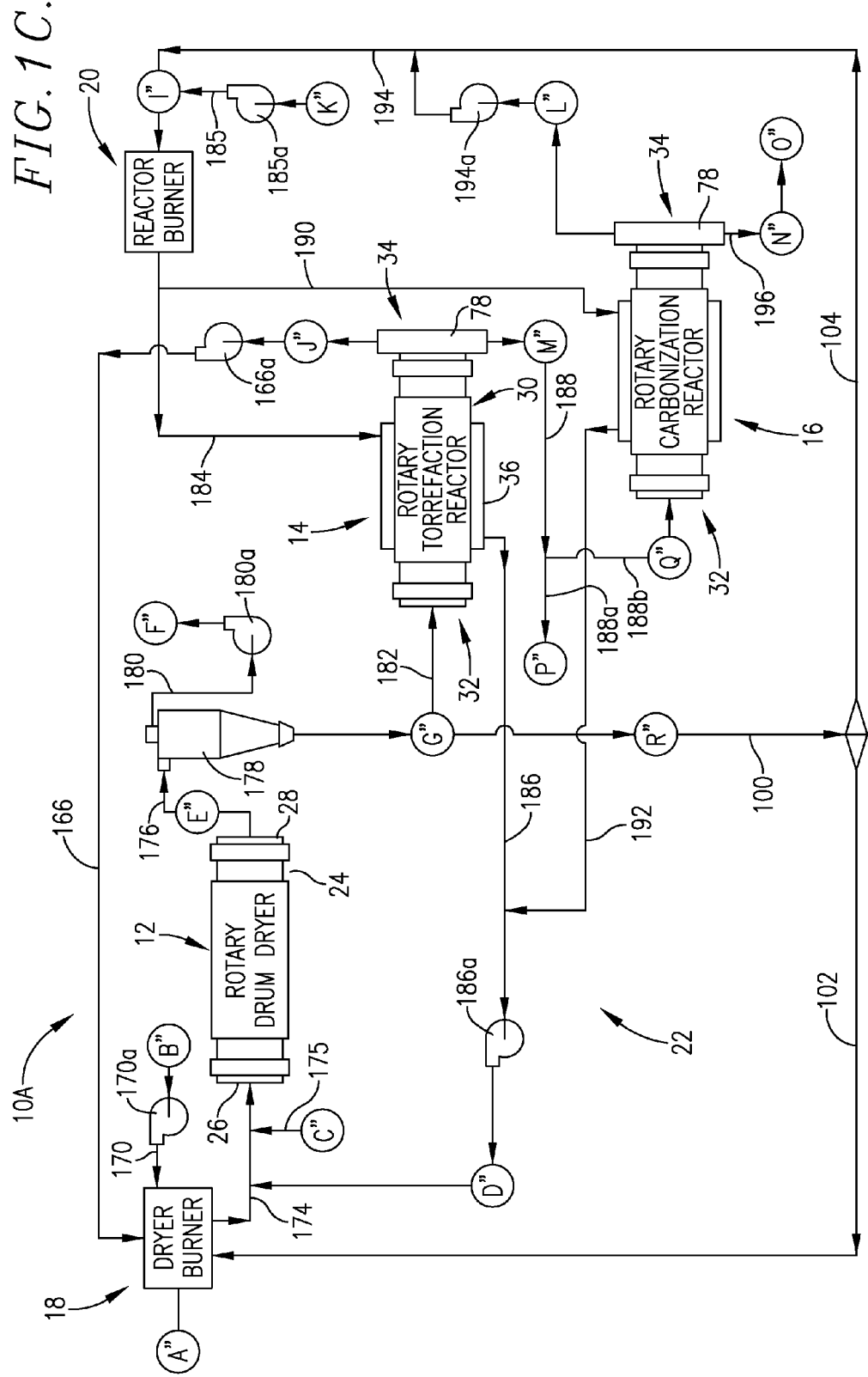
FIG. 1C is a schematic flow diagram illustrating the important components and operation of the preferred biomass conversion system of the invention, for the production of both torrefied and charcoal end products.

Turning now to the drawings, and particularly FIGS. 1A-1C, biomass conversion systems 10A, 10B, and 10C are schematically illustrated. The system 10A is designed to convert starting biomass from a variety of sources into a carbonized or charcoal product; system 10B is designed to convert the biomass to a torrefied product; and system 10C is designed to simultaneously produce both charcoal and torrefied products. As explained below, all of the systems 10A-10C further produce gaseous (VOC) fuel streams and hot gas output streams to provide a substantial fraction of thermal energy requirement for the equilibrated, steady state operation of the systems, and, in the cases of systems 10B and 10C, dried solid biomass fuel streams. A prime goal of the invention is to operate the systems 10A-10C so as to thereby supply a substantial fraction (preferably at least about 80% thereof, more preferably at least about 90% thereof, and most preferably substantially all) of the thermal energy needed in the steady state operation of the systems.

System 10A for the Production of Charcoal Products (FIG. 1A)

The principal components of the charcoal system 10A are a conventional rotary drum dryer 12, a rotary torrefaction reactor 14, a rotary carbonization reactor 16, a conventional dryer burner 18, a conventional reactor burner 20, and a conduit assembly 22 which operably interconnects the foregoing components.

The rotary drum dyer 12 is preferably of the type described in U.S. Pat. No. 7,155,841, incorporated by reference herein in its entirety. The dryer 12 includes an elongated, circular in cross-section, axially rotatable dryer shell 24 with an input 26 and an output 28. Internally, the dryer 12 has axially spaced apart first and second drying sections each equipped with a turbulator and a downstream serpentine flow section (not shown). The turbulators are designed to divert portions of a product/air stream in different directions respectively to achieve intense mixing within the shell 24.

The torrefaction reactor 14 is illustrated in detail in FIGS. 2-8 and broadly includes an elongated, horizontally extending, generally circular in cross-section rotatable metallic (carbon steel) shell 30 with an input assembly 32, and opposed output assembly 34, and a multiple-piece insulative housing 36 surrounding the shell 30. Internally, the shell 30 is equipped with an input flight assembly 38, an output flight assembly 40, and a frustoconical, spiral outlet 42. A lowermost frame assembly 43 supports the shell 30 and housing 36, and the related equipment described below.

The shell 30 includes a cylindrical main body 44 with an input end wall 46 and an output end wall 48. The wall 46 includes a central projection 50 defining a tubular inlet 52, whereas the wall 48 likewise has a central projection 54 defining an outlet opening 56. The shell 30 is designed to rotate during operation of the reactor 14 and, to this end, the input and output ends of the reactor are provided with conventional trunnion assemblies 58 and 60. In addition, the input end of the shell 30 is equipped with a circular drive sprocket 62, as well as a drive motor 64; a drive chain 66 is operatively coupled between the output 64a of motor 64 and the drive sprocket 62 so as to effect rotation of the shell 30 at a desired rotational speed (FIGS. 2 and 3).

The input assembly 32 of the shell 30 includes an elongated, tubular auger assembly 68 having a casing 70, an internal conveying auger 72 driven by motor 74, and an inlet opening 76. As will be appreciated, rotation of auger 72 serves to convey material to be processed into the interior of shell 30.

The output assembly 34 includes a stationary outer housing 78 having an upper gaseous outlet 80, a lower solids output 81, an airlock 82 in communication with output 81, and a central access door 84. The airlock 82 includes a rotary airlock permitting flow of solids from output 81, and moreover serves to prevent the escape of VOC's. The rear wall of the housing 78 further has a circular flange 86 which is in alignment with outlet opening 56, and a housing input aperture 88. A circular, circumferentially extending seal connector 90 extends around the projection 54 of output end wall 48 and the flange 86, and serves to operably interconnect the shell 30 and housing 78.

Figure 8:
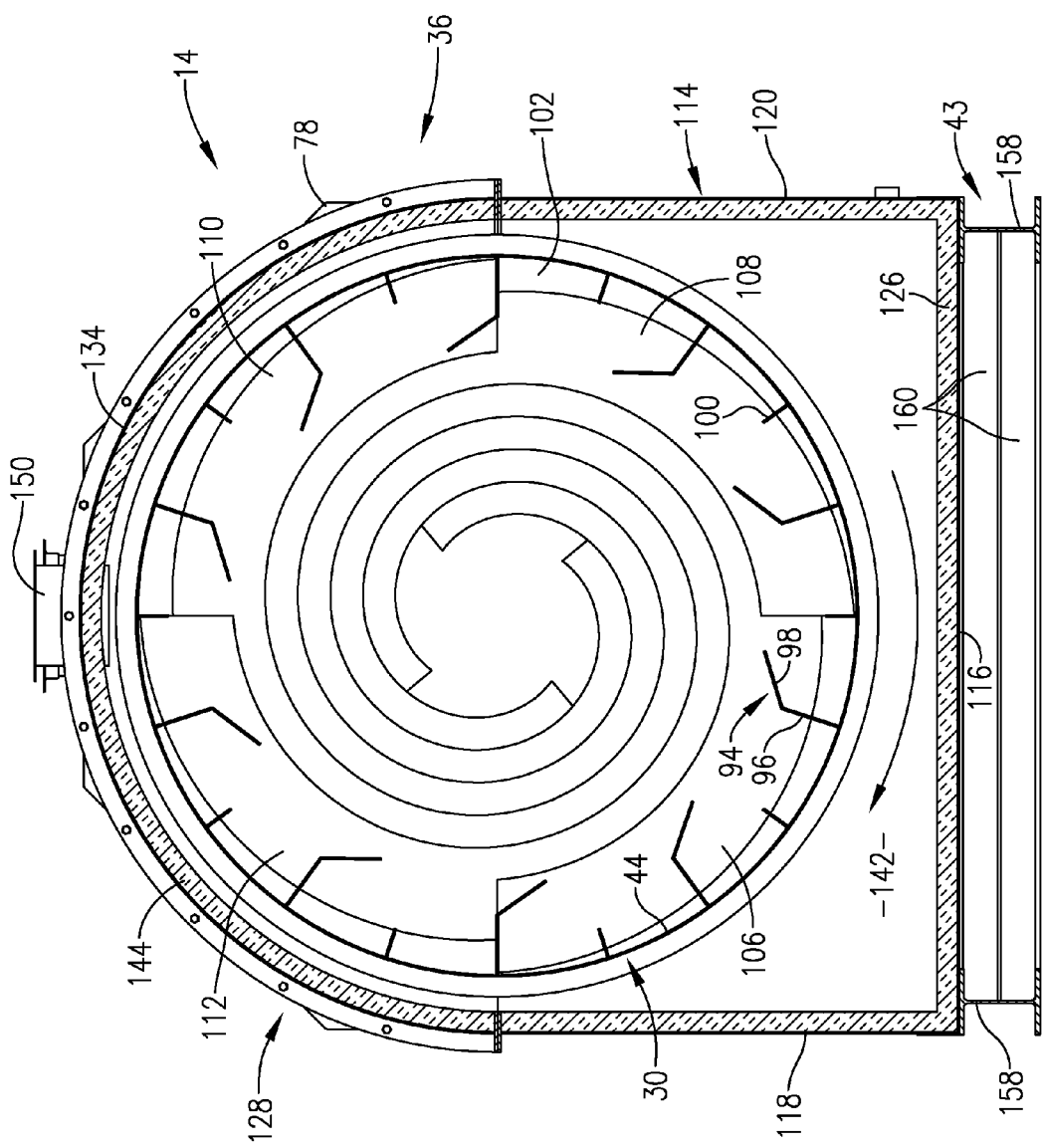
FIG. 8 is a vertical view taken along line 8-8 of FIG. 5.

The input flight assembly 38 (FIG. 6) includes a plurality of circumferentially spaced apart, spirally oriented flights 92 which extend from the inner surface of input end wall 46. The assembly 38 further has a series of equally circumferentially spaced apart angular flights 94 which extend from the flights 92 along a majority of the length of the shell 30. Each flight 94 includes an inwardly projecting segment 96 welded to the inner surface of shell 30, and an oblique segment 98 extending from the inboard end of the segment 92 (FIG. 8).

Figure 5:
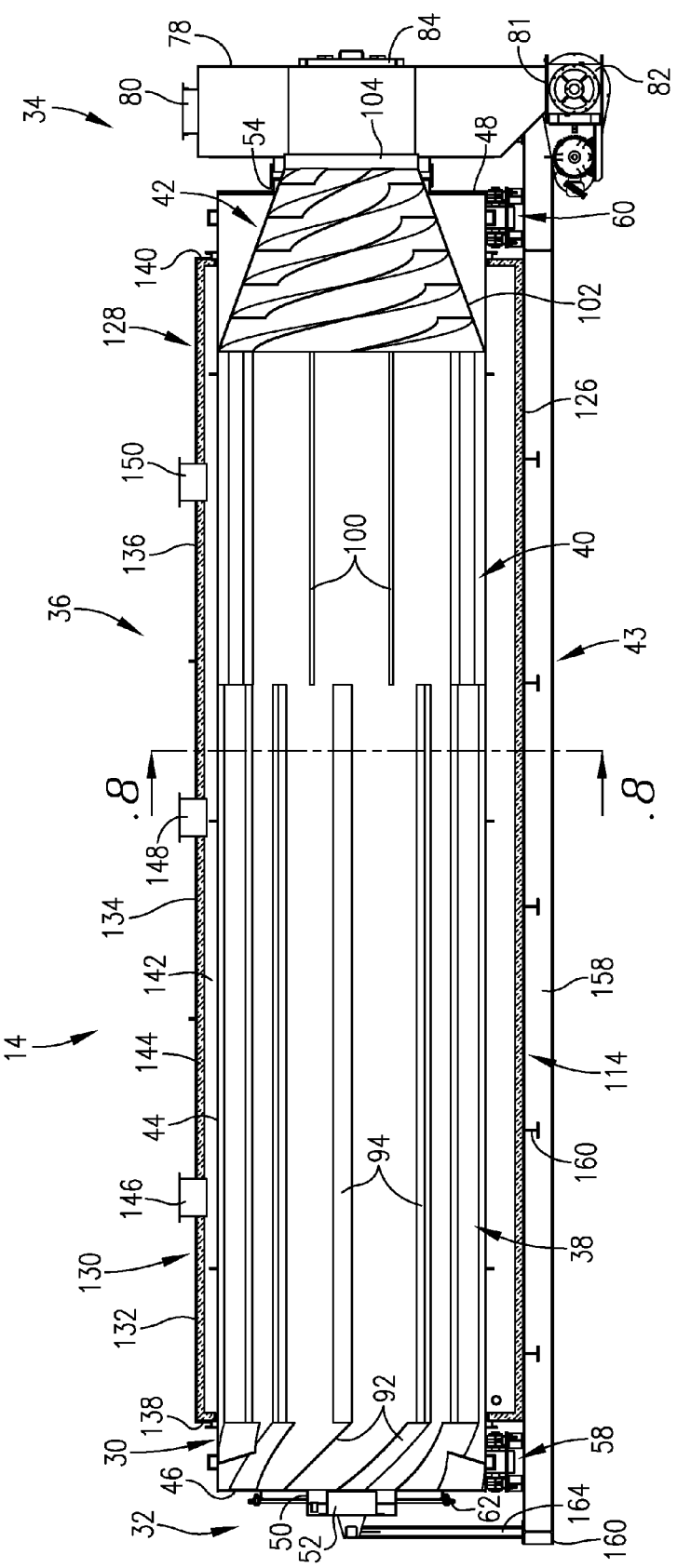
FIG. 5 is a vertical sectional view of the reactor illustrated in FIG. 2.

The output flight assembly 40 includes a series equally circumferentially spaced apart, radially inwardly extending rectilinear flights 100, which are located substantially equidistantly between the upstream angular flights 94. The flights 100 extend from the ends of the angular flights 94 up to the spiral outlet 42 (FIG. 5).

The spiral outlet 42 includes an open-ended frustoconical wall 102 which is secured to the inner surface of shell 30 and to the inner edge of the outlet opening 56 (FIG. 7) in order to rotate with the shell 30. The output end of the wall 102 includes a short cylindrical section 104 which extends into the output aperture 88. Internally, the wall 102 is equipped with a series of four equally circumferentially spaced apart spiral flights 106, 108, 110, 112.

Figure 6:
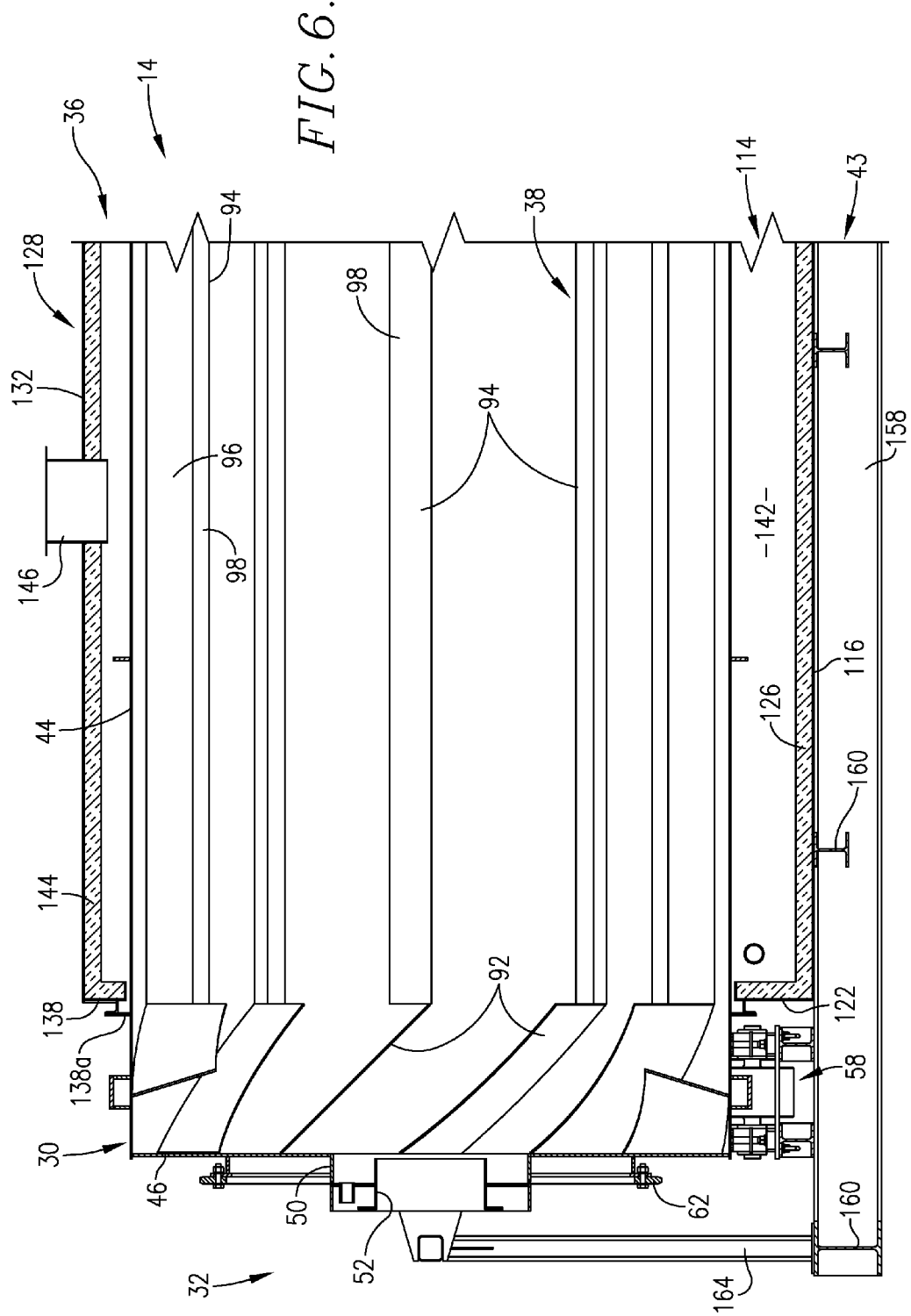
FIG. 6 is an enlarged, fragmentary sectional view illustrating the details of construction of the front input end of the reactor of FIG. 2.
Figure 7:
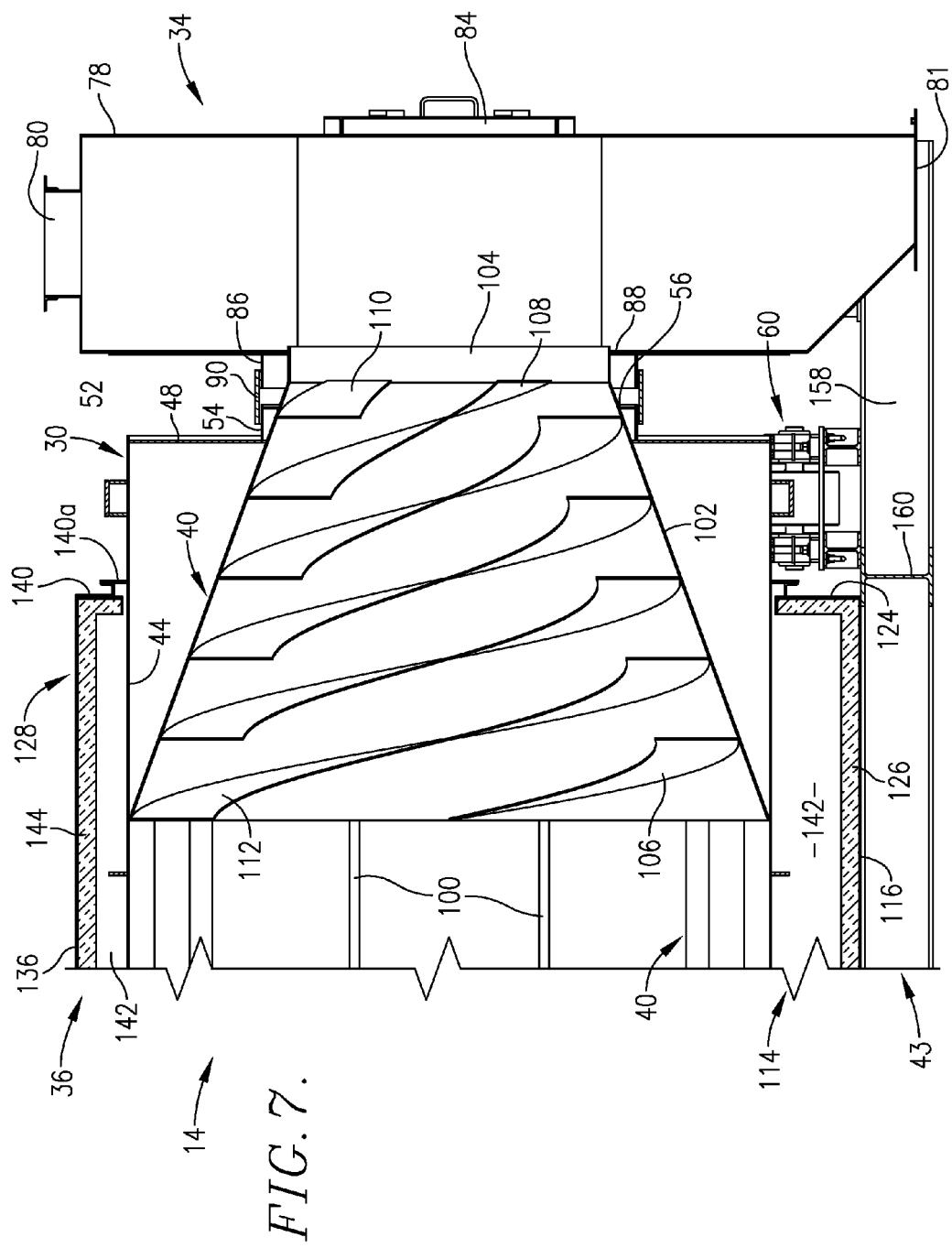
FIG. 7 is an enlarged, fragmentary sectional view illustrating the details of construction of the rear output end of the reactor of FIG. 2.

The insulated housing 36 includes a lower section 114 having a bottom wall 116, upstanding, opposed sidewalls 118, 120, and opposed end walls 122, 124, and a series of lower hot gas inputs (not shown). As best seen in FIG. 8, the sidewalls 118, 120 extend upwardly approximately to the rotational axis of shell 30, and the walls 116-124 are equipped with an inner layer of refractory thermal insulation 126. The housing 36 also has an upper arcuate section 128, including an elongated, sectionalized primary wall section 130 with end-to-end interconnected sections 132, 134, and 136, and input and output end walls 138, 140, respectively extending from the sections 132 and 136. The section 128 covers the upper half of the shell 30 and is secured to lower section 114. As best seen in FIGS. 6 and 7, the end walls 138, 140 extend into close proximity with the rotatable shell 30, and corresponding seals 138a, 140a provide a sealing engagement with the shell 30. In this fashion, the sections 114 and 128, cooperatively define an enclosed, indirect heating zone 142 around shell 30. The upper section walls 132-136 also have an internal layer of refractory thermal insulation 144.

Each of the sections 132-136 has an upstanding port 146, 148, and 150, and a shiftable slide gate 152, 154, and 156, allowing selective opening and closing of the associated ports 146-150. The ports 146-150 serve as output ports for the introduction of hot gas to the dryer 12.

The frame assembly 43 includes fore and aft extending primary rails 158 on opposite sides of the housing 36, with cross-rails 160 extending and interconnected to the rails 158 along the lengths thereof. Additionally, upstanding struts 162 are provided adjacent the housing 78 in order to support the latter, along with an inverted, U-shaped support 164 coupled with auger assembly 32.

The carbonization reactor 16 is essentially identical with the torrefaction reactor 14, except that the metallic components thereof are formed of a high temperature alloy in lieu of carbon steel. Moreover, insulative housing of the reactor 16 is equipped with castable refractory, which can withstand temperatures up to 2200-2500° F., similar to the refractory material used in the torrefaction reactor 14. Accordingly, the same reference numerals are used in describing and depicting the carbonization reactor.

The conduit assembly 22 interconnects the above-described components to form a complete, operative system. The assembly 22 includes a gaseous fuel input conduit 166 with a blower 166a, and a combustion air input conduit 170 with a blower 170a; both of the conduits 166 and 170 are coupled with dryer burner 18. An output conduit 174 extends from the output of dryer burner 18 to the input assembly 26 of drum dryer 12, in order to deliver hot combustion gas to the latter for initial drying of incoming biomass. A biomass input conduit 175 is also coupled with input assembly 26 to provide incoming biomass to the system 10A.

A solids/gas output conduit 176 is provided between the output 28 of drum dryer 12 and the input of a conventional cyclone separator 178, which serves to separate the solid and gaseous fractions received from the output 28 of drum dryer 12. A gaseous output conduit 180 provided with a blower 180a extends from the upper gaseous output of cyclone 178 to an atmospheric vent. A solids output conduit 182 extends from the lower solids output of cyclone 178 to the input assembly 32 of torrefaction reactor 14.

A hot gas input conduit 184 from the output of reactor burner 20 extends to one of the ports 146-150 of the shell 36 of reactor 14 in order to supply the indirect heat necessary to torrefy the incoming solids from cyclone separator 178. A separate conduit 185 with blower 185a provides combustion air to the burner 20. A conduit 186 equipped with a blower 186a is coupled between another of the ports 146-150 of the shell 36 and conduit 174, for delivery of additional drying hot gas to the dryer 12. The hot VOC-laden gas recovered in the output assembly of the torrefaction reactor is conveyed by line 166 equipped with blower 166a to the input of burner 18.

A torrefied solids output conduit 188 extends from the airlock 82 to convey the torrefied product to the input assembly 32 of carbonization reactor 16. The dried and torrefied product from reactor 14 is then subjected to a further carbonization reaction within the reactor 16. To this end, a hot gas input conduit 190 extends from burner 20 to the input ports along the lower half of shell 36 of reactor 16, and a residual hot gas output conduit 192 extends from the ports 146-150 to conduit 186, thereby providing another source of drying gas for use in drum dryer 12. The hot VOC-laden gas recovered in output assembly 34 of reactor 16 is conveyed by line 194 equipped with blower 194a to the input of burner 20. The final charcoal output from the system 10A is conveyed via conduit 196 from output assembly 34 of reactor 16 via airlock 82 for cooling and collection thereof.

As will be appreciated from the foregoing description, the overall system 10 is designed to serially process incoming biomass to initially dry the biomass in dryer 12, to thereupon torrefy the dried biomass in reactor 14, followed by final carbonization in reactor 16. Importantly, once the system 10A reaches an equilibrated, steady-state operation, all of the thermal energy requirements required for the operation of the system are provided in the form of gaseous VOC-laden byproducts generated by the reactors 14 and 16.

EXAMPLE 1

This is a hypothetical, computer-based example using system 10A for the conversion of a typical wood chip biomass into charcoal product, and production of all of the thermal energy used in the operation of the system, once the process has achieved steady state operation.

Referring to FIG. 1A, locations A-O are indicated throughout the system 10A. The following legend sets forth the mass-energy balance for the process at these respective locations.

---

A - dryer burner operation

500 BTU/lb
435 lb/hr VOCs
0.22 MMBtu/hr
B - combustion air to dryer burner 2,327 SCFM
32° F.
40% excess air
C - biomass infeed to dryer 4,300 lb/hr total
2,365 lb/hr solids
1,935 lb/hr water
D - hot gases to dryer 11,164 ACFM
21,647 lb/hr
2.21 MMBtu/hr
770° F.
E - dryer output 2,438 lb/hr total
2,365 lb/hr solids
73 lb/hr water
110° F.
F - vented exhaust gases 8,000 ACFM
230° F.
G - torrefaction reactor input 2,438 lb/hr total
2,365 lb/hr solids
73 lb/hr water
H - exhaust to atmosphere 4,194 ACFM
8,132 lb/hr
2.75 MMBtu/hr
1500° F.
I - reactor burner 7,300 BTU/lb
1,309 BTU/hr VOC
9.56 MMBtu/hr
J - VOCs to dryer burner 402 lb/hr
33 lb/hr water

---

K - combustion air to reactor burner 6,790 SCFM
32° F.
40% excess air
L - VOCs to reactor burner 1,276 lb/hr
33 lb/hr water
M - torrefied biomass from torrefaction reactor 2,003 lb/hr total
2% water
450° F.
N - carbonized output from carbonization reactor 694 lb/hr total
1% water
600° F.
O - cooled carbonized output 694 lb/hr total
1% water
270° F.

---

The hot gas input in line 174 was 623° F., and the dryer 12 operated at a power of 2.42 MMBtu/hr in order to evaporate 1862 lb/hr of water from the biomass infeed. The hot gas input in conduit 184 was 713° F., and the torrefaction reactor 14 operated a power of 3.09 Btu/hr to evolve VOC's from the dried biomass to generate the torrefied output product. The hot gas in line 190 was 854° F., and the reactor 16 operated at a power of 1.51 MMBtu/hr.

Considering an 8000 hr/yr operation of system 10A the annual output of the carbonized charcoal final product would be 2776 tons with 6.20 tons of starting biomass yielding 1 ton of the final product.

System 10B for the Production of Torrefied Products (FIG. 1B)

Referring to FIG. 1B, the system 10B employs many of the components of system 10a, and accordingly where appropriate the same reference numerals and foregoing descriptions will be used. Given that the system 10B produces only torrefied products, it does not employ the secondary carbonization reactor 16 and related components. Moreover, the solids from cyclone 178 are split, with a fraction delivered to reactor 14, and another fraction delivered to burner 18 and burner 20 as a source of fuel.

In detail, the solids output from conduit 182 from cyclone 178 is split using a conduit 198 to deliver a fraction thereof to the input assembly 32 of reactor 14 to yield torrefied product, and the remainder thereof is conveyed by conduit 100; this solids fraction is again split using conduits 102 and 104, for delivery of solid product to the burners 18 and 20 respectively, to provide fuel therefor. The torrefied product from reactor 14 is delivered by line 106 for cooling and recovery thereof.

The system 10B thus sequentially dries and torrefies incoming biomass, and produces both gaseous VOC and solid dried biomass fuel streams which provide a substantial amount of the thermal energy used in the process at steady-state operating conditions.

EXAMPLE 2

This is a hypothetical, computer-based example using system 10B for the conversion of a typical wood chip biomass into torrefied product, and production of thermal energy used in the operation of the system, once the process has achieved steady state operation.

Referring to FIG. 1B, locations A'-M' are indicated throughout the system 10. The following legend sets forth the mass-energy balance for the process at these respective locations.

A' - dryer burner operation 8,000 BTU/lb dried biomass
362 lb/hr dried biomass
2.90 MMBtu/hr
B' - combustion air to dryer burner 1,223 SCFM
32° F.
175% excess air
C' - biomass infeed to dryer 4,300 lb/hr total
2,365 lb/hr solids
1,935 lb/hr water
D' - hot gases to dryer 2,122 ACFM
5,885 lb/hr
0.50 MMBtu/hr
400° F.
E' - dryer output 2,438 lb/hr total
2,365 lb/hr solids
73 lb/hr water
110° F.
F' - vented exhaust gases 8,000 ACFM
230° F.
G' - torrefaction reactor input 1,909 lb/hr total
1,852 lb/hr solids
57 lb/hr water
H' - Mass loss of VOC's 315 lb/hr
26 lb/hr water
I' - reactor burner operation 7,300 BTU/lb
1,309 BTU/hr VOC
9.56 MMBtu/hr
J' - Combustion air to reactor burner 565 SCFM
32° F.
175% excess air
K' - Torrefied product 1568 lb/hor total
2% water
450° F.
L' - Cooled torrefied product 1568 lb/hr total
2% water
270° F.
M' - Dried biomass fuel to dryer and reactor burners 529 lb/hr
3% water
ambient temperature The hot gas input in line 174 was 622° F., and the dryer 12 operated at a power of 2.90 MMBtu/hr in order evaporate 1862 lb/hr of water from the biomass infeed. The hot gas input in conduit 184 was 725° F., and the torrefaction reactor 14 operated at a power of 3.09 Btu/hr to evolve VOC's from the dried biomass to generate the torrefied output product.

Considering a 8000 hr/yr operation of system 10B, the annual output of the carbonized charcoal final product would be 6273 tons.

System 10C for the Production of Both Torrefied and Charcoal Products (FIG. 1C)

The system 10C is designed to simultaneously produce torrefied and carbonized final products. The system has many of the components of the previously described system 10A, and certain components from the system 10B. Accordingly, like reference numerals in FIGS. 1A and 1B will be used throughout the ensuing discussion. There are two principal differences between systems 10A and 10C. The first is provision of apparatus for recovering a portion of the torrefied product, with the remaining portion being directed to carbonization reactor 16 via conduit legs 188*a* and 188*b*. The second difference is the use of a portion of the solid product derived from the output of cyclone 178 as a source of solid fuel to the dryer and reactor burners 18, 20, via conduits 100, 102, and 104.

EXAMPLE 3

This is a hypothetical, computer-based example using system 10C for the simultaneous conversion of a typical wood chip biomass into torrefied and charcoal products, and production of a substantial part of the thermal energy used in the operation of the system, once the process has achieved steady state operation.

Referring to FIG. 1C, locations A"-Q" are indicated throughout the system 10C. The following legend sets forth the mass-energy balance for the process at these respective locations.

A" - dryer burner - wood/VOC burner 8,000 BTU/lb wood
232 lb/hr wood
1.86 MMBTU/hr
B" - combustion air 713 SCFM
32° F.
150% excess air
C" - biomass infeed to dryer 4,300 lb/hr total
2,365 lb/hr solids
1,935 lb/hr water
D" - hot gases to dryer 4,371 ACFM
8,476 lb/hr
1.36 MMBTU/hr
770° F.
E" - dryer output 2,438 lb/hr total
2,365 lb/hr solids
73 lb/hr water
3% moisture
110° F.
F" - vented exhaust gases 8,000 ACFM
230° F.
G" - torrefaction reactor input 2,201 lb/hr total
3% water
110° F.

-continued

I" - reactor burner - wood/VOC burner 7,300 BTU/lb VOC
591 lb/hr VOC
8,000 BTU/lb wood
5 lb/hr wood
4.33 MMBTU/hr
J" - VOCs to dryer burner 363 lb/hr
30 lb/hr water
K" - combustion air to reactor burner 3,065 SCFM
32° F.
80% excess air
L" - VOCs to reactor burner 576 lb/hr
15 lb/hr water
O" - wood fuel to burners 237 lb/hr total
0% water
ambient temperature
P" - torrefied product output 1,808 lb/hr total
2% water
450° F.
Q" - recovered torrefied product 904 lb/hr total
2% water
270° F.
M" - carbonized biomass output 313 lb/hr total
1% water
600° F.
N" - cooled carbonized output 313 lb/hr total
1% water
270° F.

The hot gas input to dryer 12 in line 174 was 621° F., and the dryer 12 operated at a power of 3.22 MMBtu/hr in order evaporate 1862 lb/hr of water from the biomass infeed. The hot gas input in conduit 184 was 758° F., and the torrefaction reactor 14 operated a power of 2.85 Btu/hr to evolve VOC's from the dried biomass to generate the torrefied output product. The hot gas in line 190 was 838° F., and the reactor 16 operated at a power of 1.40 MMBtu/hr.

Considering an 8000 hr/yr operation of system 10C the annual output of the torrefied product would be 3617 tons, and the output of the carbonized product would be 1253 tons.

We claim:
1. A reactor for treating biomass, comprising:
   an elongated, tubular, generally circular in cross-section, axially rotatable shell having a length and a biomass input adjacent one end thereof and an end remote from said input;
   a hollow, frustoconical wall section having an outer surface and an inner surface, a larger diameter end and a smaller diameter end, and a length less than the length of said shell,
   the larger diameter end of said frustoconical wall section operably coupled with said shell end remote from said input such that the shell and frustoconical wall section rotate together;
   fighting structure secured to said inner surface of said frustoconical wall section and extending inwardly from said inner surface, said fighting structure oriented spirally along the length of said inner surface; and
   a housing in surrounding relationship to at least a portion of the length of said shell and defining with the shell an indirect heating zone, said shell having a hot gas inlet operable to receive hot gas for indirectly thermally treating biomass within said shell, and a gas outlet,
   said smaller diameter end of said frustoconical wall section defining a treated biomass outlet.
2. The reactor of claim 1, said flighting structure comprising a number of individual spiral walls circumferentially spaced from one another around said frustoconical wall.
3. The reactor of claim 1, including a series of internal flights along the length of said shell and each including a first segment secured to the internal surface of said shell, and a second segment oriented at an angle relative to said first segment.
4. The reactor of claim 1, including a stationary outer housing in communication with said smaller diameter end of said frustoconical wall section, said housing having an upper gaseous outlet and a lower solids outlet.
5. The reactor of claim 1, including a rotary airlock adjacent said biomass output.
6. The reactor of claim 1, said shell extending the full length of said shell.

* * * * *